US006558126B1

United States Patent
Hahn et al.

(10) Patent No.: US 6,558,126 B1
(45) Date of Patent: May 6, 2003

(54) COMPRESSOR UTILIZING LOW VOLT POWER TAPPED FROM HIGH VOLT POWER

(75) Inventors: Greg Hahn, Arkadelphia, AR (US); Zili Sun, Arkadelphia, AR (US); Carlos Zamudio, Arkadelphia, AR (US); Jason Hugenroth, Hope, AR (US); Thomas Barito, Arkadelphia, AR (US); James W. Bush, Skaneateles, NY (US); Joe T. Hill, Bristol, VA (US); John R. Williams, Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/562,984

(22) Filed: May 1, 2000

(51) Int. Cl.⁷ .................................................. F04B 49/06
(52) U.S. Cl. ........................... 417/44.1; 417/26; 417/28
(58) Field of Search ........................ 417/26, 28, 44.1, 417/32, 310, 410.5; 310/87, 89

(56) References Cited

U.S. PATENT DOCUMENTS

| | | | | |
|---|---|---|---|---|
| 4,743,168 A | * | 5/1988 | Yannascolli | 417/53 |
| 4,950,135 A | * | 8/1990 | Tojo et al. | 417/410 |
| 5,076,067 A | * | 12/1991 | Prenger et al. | 62/197 |
| 5,200,872 A | * | 4/1993 | D'Entremont et al. | 361/25 |
| 5,509,786 A | * | 4/1996 | Mizutani et al. | 417/32 |
| 6,174,136 B1 | * | 1/2001 | Kilayko et al. | 417/44.1 |

\* cited by examiner

Primary Examiner—Timothy S. Thorpe
Assistant Examiner—William H. Rodriguez
(74) Attorney, Agent, or Firm—Carlson, Gaskey & Olds

(57) ABSTRACT

Low voltage electrical power is supplied to a diagnostic control device in a sealed compressor. Electrical power is tapped from a high voltage power line and transformed to low voltage power that in turn operates the diagnostic control device. The diagnostic control device and the electric voltage transforming system are housed within the sealed compressor shell, thus eliminating the need for additional openings in the compressor shell. Other low voltage devices can be powered in this way.

9 Claims, 1 Drawing Sheet

COMPRESSOR UTILIZING LOW VOLT POWER TAPPED FROM HIGH VOLT POWER

BACKGROUND OF THE INVENTION

This invention relates to a system provided within the shell or sealed housing of a compressor for converting high voltage electric power from a single power source to low voltage electric power for powering the auxiliary compressor systems, such as a diagnostic control device.

Compressors are utilized to compress a refrigerant as part of a refrigerant cycle in cooling systems. Modern compressors for refrigerant compression are typically enclosed within a sealed housing. Typically compressors are driven by an electric motor which receives high voltage electric power from an outside electrical power source by way of a power line extending through an opening in the sealed housing. It is essential that all openings through the sealed housing are well sealed to prevent leakage.

Refrigerant compressors operate under extreme conditions and may have relatively complex operational components. Compressor operation presents many design challenges. In addition to the potential for leakage as mentioned above, there is the potential for a variety of operational faults to occur during use as well as during startup and shutdown. For example, an overcharge or undercharge of refrigerant can hinder compressor performance. An improperly wired compressor can also result in compression malfunction.

Typically, compressors have been provided with a plurality of protection devices that sense various performance properties of essential compressor components as compared to predetermined values. The protection devices then respond accordingly predetermined manner. For example, the electric motor used for driving a compressor pump is typically provided with a protection switch, which is actuated if a predetermined temperature is reached at which point the motor is stopped. Also, condition responsive valves have been proposed in sealed compressors.

The inventors of this application have recently proposed sensing various performance properties of essential compressor components using a singular diagnostic control device. The diagnostic control device, which is preferably microprocessor based, receives signals relating to a number of operational factors in a compressor. The diagnostic control device is disclosed in co-pending application No. 09/553936, filed Apr. 21 2000, entitled "Compressor Diagnostic and Recording System".

Typically, the compressor elements are driven by an electric motor. The electric motor is housed within the compressor shell and is powered by a high voltage source originating at a point outside the compressor shell by way of a power line received through an inlet opening in the compressor shell.

The microprocessor based diagnostic control device operates using relatively low voltage electric power as compared to the relatively high voltage electric power required to power the electric motor of the compressor. The same is true for the above-mentioned sensors, etc.

Thus, it would be desirable for a low voltage device, such as diagnostic control device, a sensor, etc. to make use of the existing electric power supply that powers the electric motor of the compressor. Thus, the low voltage device can be positioned within the compressor shell without requiring additional low volts wiring to be fed through any additional openings in the sealed compressor shell.

SUMMARY OF THE INVENTION

In the disclosed embodiment of this invention a refrigerant compression system is provided with an electronic circuit to feed low voltage electrical power to a diagnostic control device. The diagnostic control device is positioned within the sealed housing, of the compressor and operates using low voltage electrical power. The low voltage electrical power required to operate the diagnostic control device is obtained from an existing high voltage electric power source that is used to power the motor of the compressor.

The compressor shell is provided with an inlet opening through which a high voltage power line extends. The high voltage power line extends from a high voltage electric power source positioned outside of the sealed compressor shell. Within the compressor shell, the electric power used to operate the diagnostic control device is tapped from the existing high voltage incoming power line, and then converted to the required low volts electric power. The power is converted using a known conversion circuit preferably including a transformer.

The diagnostic control device is powered with the desired low voltage electric power using the existing high voltage power line. Thus, the necessity to feed additional low voltage wiring through any additional inlet openings in the compressor shell is eliminated.

While the invention is disclosed for powering a diagnostic control device, other low voltage devices such as sensors, etc. can also be powered in this fashion.

These and other features of the present invention can be best understood from the following specification and drawing, the following of which is a brief description.

DETAILED DESCRIPTION OF A PREFERRED EMBODIMENT

Figure 1:
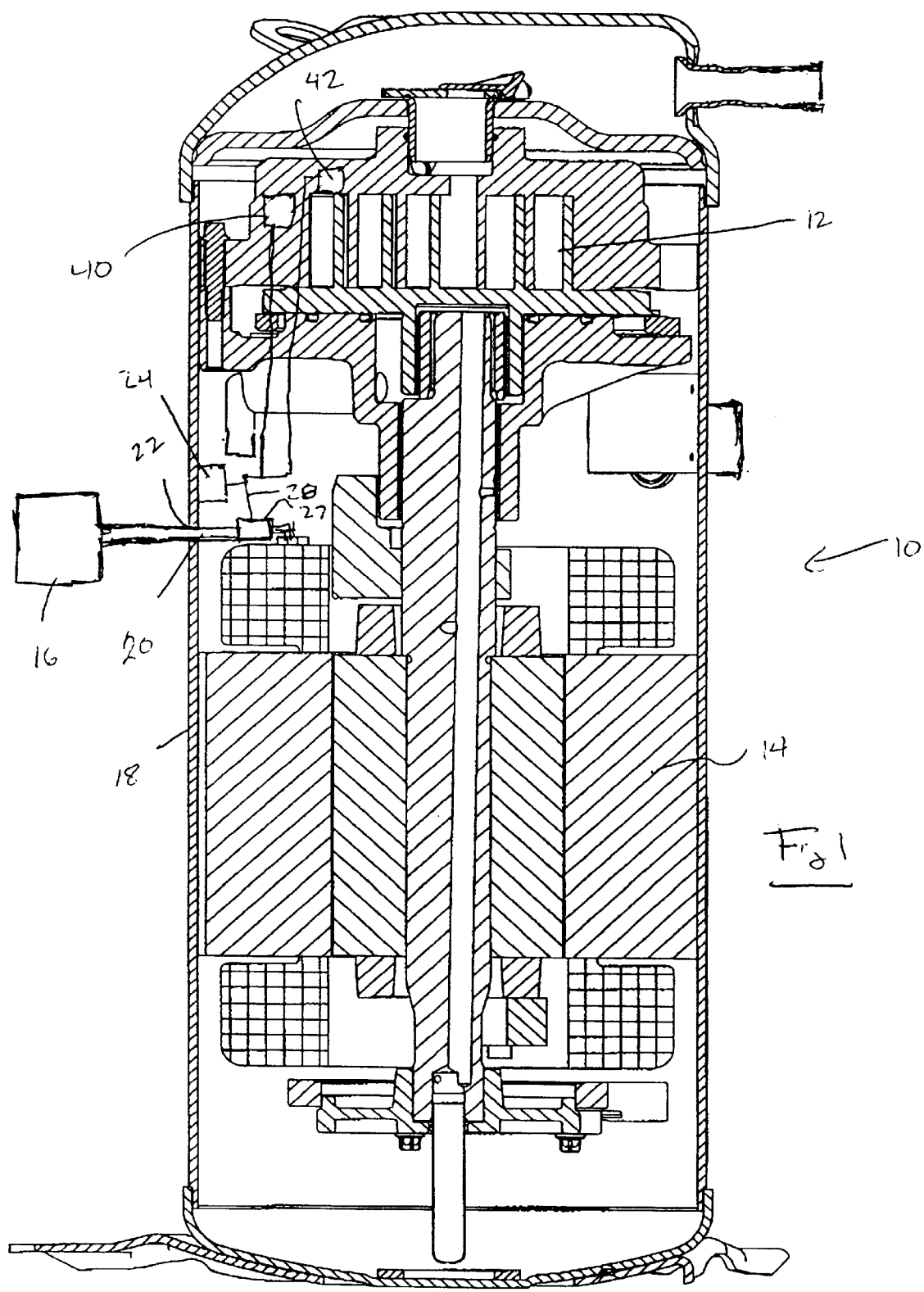
FIG. 1 is a schematic view of a portion of a sealed compressor that incorporates a system to feed low voltage electrical power to a diagnostic control device.

A sealed compressor 10 is illustrated generally and schematically in FIG. 1. It should be understood that compressor 10 is preferably incorporated into a refrigerant cycle, such as that typically found in air conditioning or other cooling or heating cycles.

A compressor pump unit, as that typically utilized in a scroll type compressor, is schematically shown at 12. The scroll compressor pump unit 12 is driven by electric motor 14. Electric motor 14 is powered by a high voltage outside power source 16. The power source may be three phase, or single phase. Compressor pump unit 12 and electric motor 14 are housed in sealed compressor shell 18. The high voltage electric power from outside power source 16 is fed to motor 14 by way of incoming power line 20 which enters compressor shell 18 through inlet opening 22.

A diagnostic control device 24 is provided at a location within the compressor shell 18. Diagnostic control device 24, which is, preferably a microprocessor can monitor a variety of operational conditions of the compressor 10 during use. The details of the control device are as disclosed in co-pending application, Ser. No. 09/553,836 filed Apr. 21, 2000 and entitled "Compressor Diagnostic and Recording System". Diagnostic control device 24 requires a relatively low voltage electrical power supply in order to operate. Electrical power is tapped from incoming power line 20 at a power tap and converted to the required lower voltage electrical power by way of conversion circuit 27 which include a transformer and appropriate circuit safety components. A worker in the electrical arts could provide an appropriate conversion circuit. The lower voltage electrical power is then supplied to diagnostic control device 24 by way of power feed line 28.

The diagnostic control device 24 operates using power from the existing incoming power line 20, thus eliminating the need for additional low voltage wiring to be fed through any additional openings in the compressor shell 18.

A sensor 40 is also shown schematically and controls an electronically operated valve 42. Devices 40 and 42 both operate using low voltage and receive power from conversion circuit 27. The devices 24, 40 and 42 can be used individually, or in combination. If more than one device is powered by circuit 27, an appropriate routing circuit may be used. It should be understood the devices 40 and 42 may be as known, and form no portion of this invention.

A preferred embodiment of this invention has been disclosed, however, a worker in this art would recognize that certain modifications would come within the scope of this invention. For that reason, the following claims should be studied to determine the true scope and content of this invention.

What is claimed is:

1. A Compressor comprising:
   a sealed compressor shell housing a compressor pump unit, an electric motor for driving said compressor pump unit, and a low voltage microprocessor diagnostic control for monitoring predetermined aspects of compressor performance, said compressor pump unit, said electric motor, and said low voltage microprocessor diagnostic control all being received within said compressor shell;
   an inlet opening in said compressor shell for receiving an incoming high voltage electric power supply for powering said electric motor; and
   a system for converting said incoming high voltage electric power to a low voltage electric power, and feeling low voltage electric power to said low voltage microprocessor diagnostic control.

2. A compressor as recited in claim, 1 wherein said system for converting to low voltage electric power is housed within said sealed compressor shell.

3. A compressor as recited in claim 2, wherein said system for converting low voltage electric power has a power tap associated with said incoming high voltage electric power supply; and
   a circuit for converting high voltage electric power to low voltage electric power.

4. A compressor as recited in claim 3, wherein said circuit for converting high voltage electric power to low volt electric power includes a transformer.

5. A compressor as recited in claim 1, wherein said compressor pump unit is a scroll compressor.

6. A compressor as recited in claim 1, wherein a sensor is also provided with low voltage power.

7. A compressor as recited in claim 1, wherein a valve is also provided with low voltage power.

8. A compressor comprising:
   a sealed compressor shell housing a compressor pump unit, an electric motor for driving said compressor pump unit, a diagnostic microprocessor control device for monitoring predetermined aspects of compressor performance, and a conversion circuit for feeding low voltage electric power to said diagnostic control device;
   an inlet opening in said compressor shell for receiving an incoming high voltage electric power supply for powering said electric motor; and
   said circuit for feeding low voltage electric power to said diagnostic microprocessor control device comprises a power tap associated with said incoming high voltage electric power supply, and a system for converting high voltage electric power to low voltage electric power for powering said diagnostic microprocessor control device.

9. A compressor as recited in claim 8, wherein said circuit for converting high voltage electric power to low volt electric power includes a transformer.

* * * * *

UNITED STATES PATENT AND TRADEMARK OFFICE
CERTIFICATE OF CORRECTION

PATENT NO.    : 6,558,126 B1                                            Page 1 of 1
DATED         : May 6, 2003
INVENTOR(S)   : Hahn et al.

It is certified that error appears in the above-identified patent and that said Letters Patent is hereby corrected as shown below:

Column 3,
Line 40, "feeling" should be -- feeding --.

Signed and Sealed this

Eighth Day of July, 2003

JAMES E. ROGAN
*Director of the United States Patent and Trademark Office*